United States Patent
Park et al.

(10) Patent No.: US 7,555,158 B2
(45) Date of Patent: Jun. 30, 2009

(54) APPARATUS FOR RECOVERING BACKGROUND IN IMAGE SEQUENCE AND METHOD THEREOF

(75) Inventors: Chang-Joon Park, Daejon (KR); Hong-Seok Kim, Seoul (KR); Sung-Eun Kim, Daejon (KR); In-Ho Lee, Daejon (KR); Hyun-Bin Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 769 days.

(21) Appl. No.: 11/283,118

(22) Filed: Nov. 18, 2005

(65) Prior Publication Data

US 2006/0120592 A1 Jun. 8, 2006

(30) Foreign Application Priority Data

Dec. 7, 2004 (KR) .................. 10-2004-0102663
Apr. 27, 2005 (KR) .................. 10-2005-0034890

(51) Int. Cl.
*G06K 9/00* (2006.01)
*G06K 9/34* (2006.01)
*G06K 9/20* (2006.01)
*H04N 7/18* (2006.01)
*H04N 5/30* (2006.01)
*G09G 5/00* (2006.01)

(52) U.S. Cl. .................. 382/154; 382/173; 382/282; 348/139; 348/159; 345/619

(58) Field of Classification Search .................. 382/173, 382/154, 282, 283; 345/619; 348/139, 159

See application file for complete search history.

(56) References Cited

U.S. PATENT DOCUMENTS

| 5,684,887 | A | 11/1997 | Lee et al. | |
|---|---|---|---|---|
| 6,061,462 | A | 5/2000 | Tostevin et al. | |
| 6,226,388 | B1 | 5/2001 | Qian et al. | |
| 6,393,134 | B1 | 5/2002 | Tostevin et al. | |
| 2001/0046309 | A1* | 11/2001 | Kamei | 382/103 |
| 2004/0222987 | A1* | 11/2004 | Chang et al. | 345/419 |
| 2005/0104878 | A1* | 5/2005 | Kaye et al. | 345/419 |
| 2005/0129324 | A1* | 6/2005 | Lemke | 382/254 |
| 2007/0076016 | A1* | 4/2007 | Agarwala et al. | 345/629 |
| 2007/0110285 | A1* | 5/2007 | Hanna et al. | 382/117 |
| 2008/0056536 | A1* | 3/2008 | Hildreth et al. | 382/103 |

FOREIGN PATENT DOCUMENTS

| EP | 0633546 | 6/1994 |
|---|---|---|
| KR | 20000012315 | 3/2000 |

OTHER PUBLICATIONS

"Mosaics of video sequences with moving objects," Chiou-Ting Hsu et al, Signal Processing: Image Communication 19 (2004), pp. 81-98.

* cited by examiner

*Primary Examiner*—Matthew C Bella
*Assistant Examiner*—Randolph Chu
(74) *Attorney, Agent, or Firm*—Ladas & Parry LLP

(57) ABSTRACT

Provided is a background recovering apparatus for deleting an object of an arbitrary region and recovering a background covered with the object. The apparatus includes a storing block for storing the input image sequence, and storing the three dimensional (3D) position and posture information, and focal length information; a geometric information extracting block for extracting 3D with respect to the background; a background image generating block for generating the background image; and a background image inserting block for recovering the background by inserting the background image into an arbitrary region of a first view point.

6 Claims, 9 Drawing Sheets

APPARATUS FOR RECOVERING BACKGROUND IN IMAGE SEQUENCE AND METHOD THEREOF

FIELD OF THE INVENTION

The present invention relates to an apparatus for recovering a background in an image sequence and a method thereof; and, more particularly, to a background recovering apparatus for deleting an object of an arbitrary region and recovering the background covered with the object, and a method thereof.

DESCRIPTION OF RELATED ART

FIG. 1 is a diagram illustrating a conventional background recovering principle. The conventional background recovering principle will be described hereinafter referring to FIG. 1.

First, an image sequence 101 carrying a photographed moving object 102 is received. In FIG. 1, the moving object 102 is a globe.

Subsequently, a moving object region is detected. That is, a part having a change of the image is detected by using a difference image between frames in the received image sequence. In FIG. 1, a square 103 covering the globe is detected as a part having a change of the image.

Subsequently, the other part excluding the part 103 having an image change in each frame is considered as a background region to be recovered (see 104), and a final image including (see 105) the recovered background acquired by overlapping the background of all frames.

The conventional background recovering method, which recovers the background by collecting the parts without image change in an image sequence, requires that there should be no movement or rotation of the camera. Therefore, the conventional background recovering method has a problem that it is difficult to apply the conventional background recovering method to a general image sequence photographed with a moving camera.

SUMMARY OF THE INVENTION

It is, therefore, an object of the present invention to provide a background recovering apparatus for deleting an object of an arbitrary region existing in an image sequence and recovering a background covered with the object by using an image of another view point, and a method thereof.

Other objects and advantages of the invention will be understood by the following description and become more apparent from the embodiments in accordance with the present invention, which is set forth hereinafter. It will be also apparent that objects and aspects of the invention can be embodied easily by the means defined in the claims and combinations thereof.

In accordance with an aspect of the present invention, there is provided a background recovering apparatus for deleting an object of an arbitrary region in an input image sequence and recovering a background, including: a storing block for storing the input image sequence, and storing the three dimensional (3D) position and posture information, and focal length information of a camera photographing an image; a projection matrix generating block for generating a projection matrix of a first view point by using the 3D position and posture information and focal length information of the camera photographing an image frame of the first view point, in which a deletion target object exits; a geometric information extracting block for extracting 3D geometric information with respect to the background by using the 3D position and posture information, focal length information, and the background region coordinates of the camera photographing an image frame of another view point that reveals the background behind the deletion target object; a background image generating block for generating the background image whose view point is changed into the first view point by multiplying the 3D geometric information for the background extracted from image frame of another view point by the projection matrix; and a background image inserting block for recovering the background by inserting the background image, whose view point is changed into the first view point, into an arbitrary region of the first view point.

In accordance with another aspect of the present invention, there is provided a method for deleting an object of an arbitrary region in the input image sequence and recovering the background, including the steps of: a) generating the projection matrix of a first view point by using 3D position and posture information, and the focal length information of a camera photographing an image frame of the first view point, where the deletion target object exists; b) extracting 3D geometric information for the background by using the 3D position and posture information, the focal length information, and the background region coordinates of the camera photographing the image frame that reveals the background covered with the deletion target object; c) generating the background image whose view point is changed into the first view point by multiplying the projection matrix by the 3D geometric information extracted from an image of another view point; and d) recovering the background by inserting the background image that the view point is changed into the first view point into an arbitrary region of the first point.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on the prior art may blur the points of the present invention, the detailed description will not be provided herein. The preferred embodiments of the present invention will be described in detail hereinafter with reference to the attached drawings.

Figure 1:
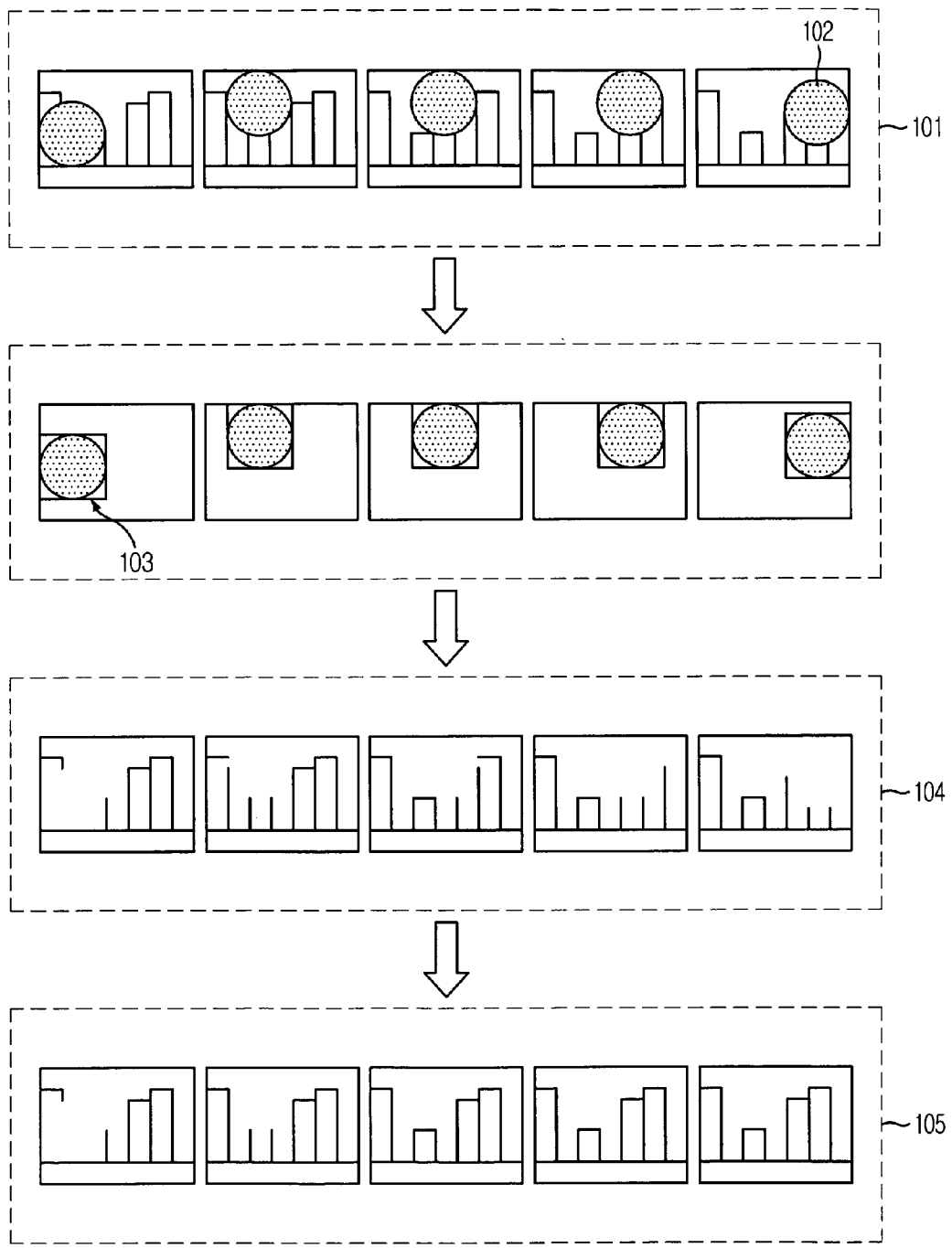
FIG. 1 is a diagram illustrating a conventional background recovering principle.
Figure 2:
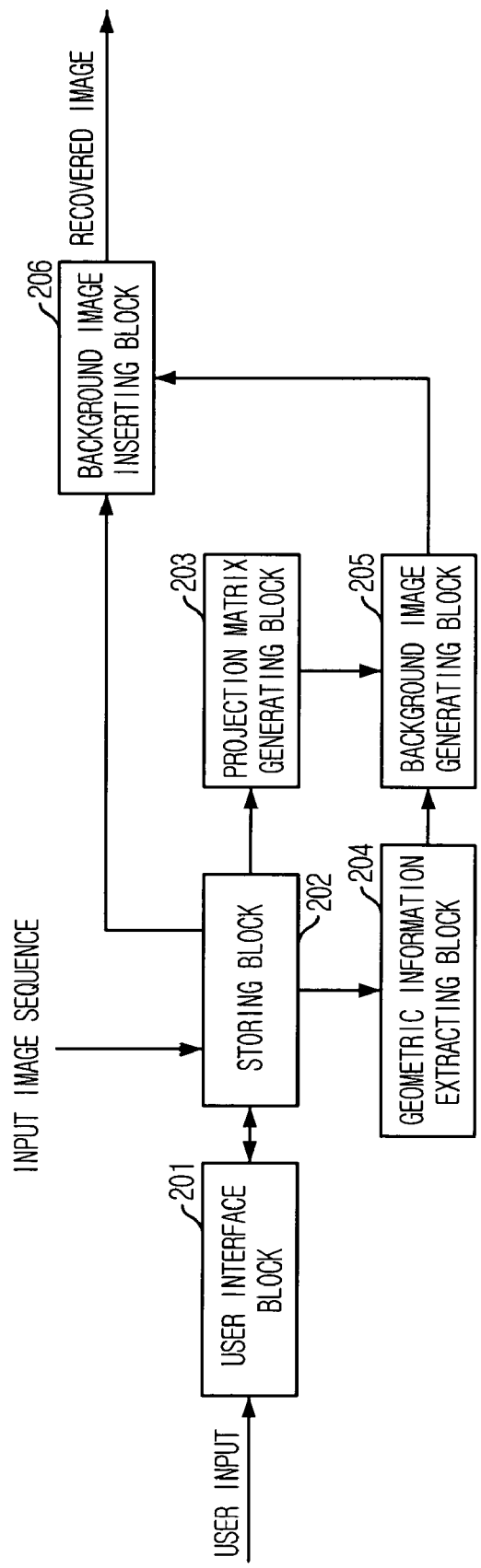
FIG. 2 is a block diagram showing a video background recovering apparatus in accordance with an embodiment of the present invention.

FIG. 2 is a block diagram showing a video background recovering apparatus in accordance with an embodiment of the present invention.

As shown in FIG. 2, the video background recovering apparatus of the present invention includes a user interface block 201, a storing block 202, a projection matrix generating block 203, a geometric information extracting block 204, a background image generating block 205, and a background image inserting block 206.

The storing block 202 stores an image sequence inputted from the outside. Herein, three-dimensional (3D) position and posture information of a camera are received and stored together with the image sequence. That is, the 3D position and posture information, focal length information, and coordinates of the background region of the camera photographing the image frame in each image frame are stored.

If a user designates an object of an arbitrary region to be deleted in the image sequence through the interface block 201, the projection matrix generating block 203 generates a projection matrix of a first view point by using the 3D position and posture information, and the focal length information of the camera photographing the image frame that the deletion target object exists, i.e., an image frame of the first view point.

The geometric information extracting block 204 extracts 3D geometric information with respect to the covered background region from the other two image frames that the background covered with the deletion target object can be seen. That is, the geometric information extracting block 204 extracts 3D geometric information with respect to the covered background region by using the 3D position and posture information, focal length information, and the background region coordinates of the camera photographing the image frame from the image frame of a second view point that the background covered with the deletion target object can be seen, and by using the 3D position and posture information, focal length information of the camera photographing the image frame from the image frame of a third view point that the background covered with the deletion target object can be seen, and coordinates of the same background region designated in the second view point.

The background image generating block 205 generates a background region that the view point is changed into the first view point by multiplying the projection matrix of the first view point by the 3D geometric information with respect to the background region extracted from the geometric information extracting block 204. That is, the 3D geometric information with respect to the background region covered in the first view point is extracted in the second and third view points, and the background region that the view point is changed into the first view point is generated by multiplying the 3D geometric information by the projection matrix of the first view point.

The background image inserting block 206 recovers the background by inserting the background image, that is generated in the background image generating block 205 and that the view point is changed into the first view point, into the deletion target object region of the first view point.

Meanwhile, the background image generating block 205 can correct resolution by interpolation of the background image that is generated in the background image generating block 205, and that the view point is changed into the first view point. That is, if the background image whose view point is changed into the first view point in the background image generating block 205 is generated, quality of the image can be deteriorated. Therefore, a clean image-correcting resolution can be obtained by applying an interpolation technique.

Figure 3:
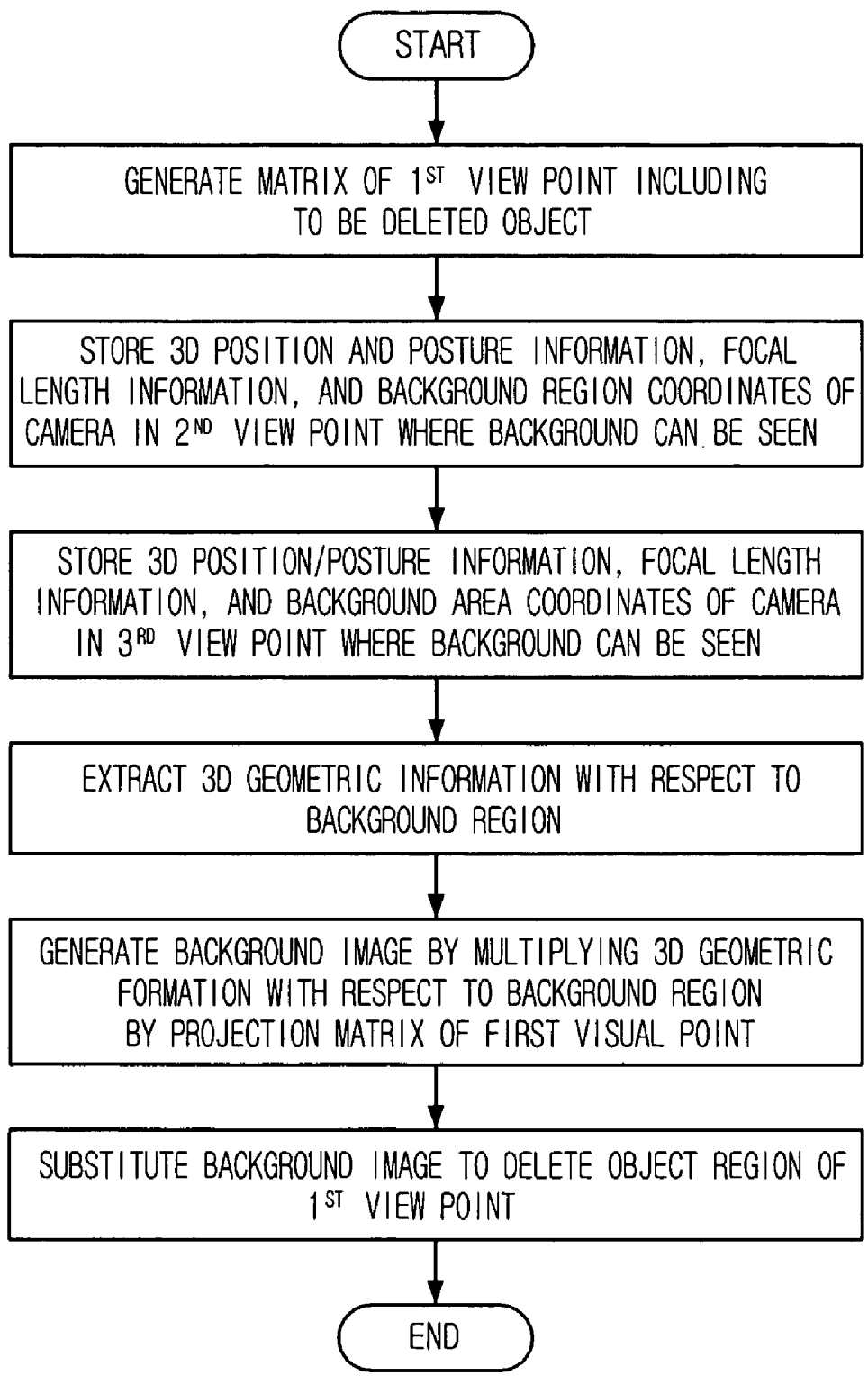
FIG. 3 is a flowchart illustrating a background recovering method of video in accordance with an embodiment of the present invention.

FIG. 3 is a flowchart illustrating a background recovering method of video in accordance with an embodiment of the present invention.

As shown in FIG. 3, at step S301, the projection matrix of the first view point is generated by using the 3D position and posture information, and the focal length information of the camera photographing the frame based on the first view point, where the deletion target object of an input image sequence exists.

At step S302, the 3D position and posture information, the focal length information, and the covered background region coordinates of the camera photographing the frame in another view point, i.e., an image frame of the second view point, where the background covered with the deletion target object can be seen, are stored.

At step S303, the 3D position and posture information, the focal length information, and the covered background region coordinates of the camera photographing the frame in another view point, i.e., an image frame of a third view point, where the background covered with the deletion target object can be seen, are stored.

At step S304, 3D geometric information with respect to the background information is extracted by using the 3D position and posture information, the focal length information, and the covered background region coordinates of the camera in the second and third view points. Herein, corresponding point matching is used.

At step S305, the background image is generated that the view point is changed into the first view point by multiplying the 3D geometric information with respect to the background information by the projection matrix of the first view point.

At step S306, the image with the deletion target object deleted and the background recovered is acquired by substituting the generated background image in the deletion target object region of the first view point.

Meanwhile, the resolution can be corrected by interpolating the background image that is generated at the step S305, and that the view point is changed into the first view point. That is, if the background image that the view point is changed into the first view point at the step S305 is generated, quality of the image can be deteriorated. Therefore, the clean image with corrected resolution can be obtained by applying an interpolation technique.

Figure 4A:
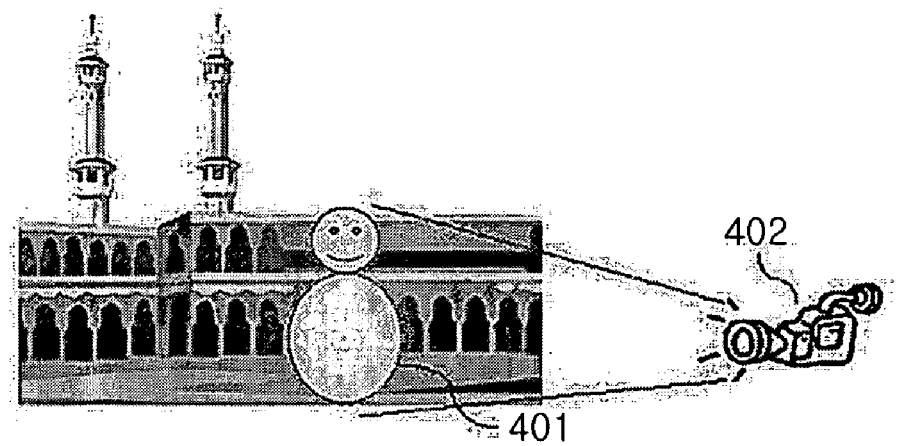
FIG. 4A is an exemplary image frame including a target object to be deleted, i.e., a deletion target object.
Figure 4B:
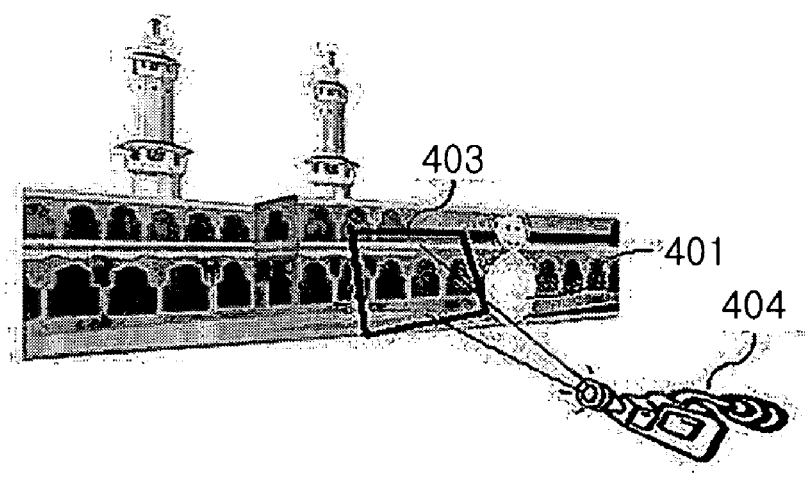
FIG. 4B is an exemplary image frame that the background covered with the deletion target object can be observed.

FIG. 4A is an exemplary image frame including a target object to be deleted, i.e., a deletion target object and FIG. 4B is an exemplary image frame that the background covered with the deletion target object can be observed.

Figure 4C:
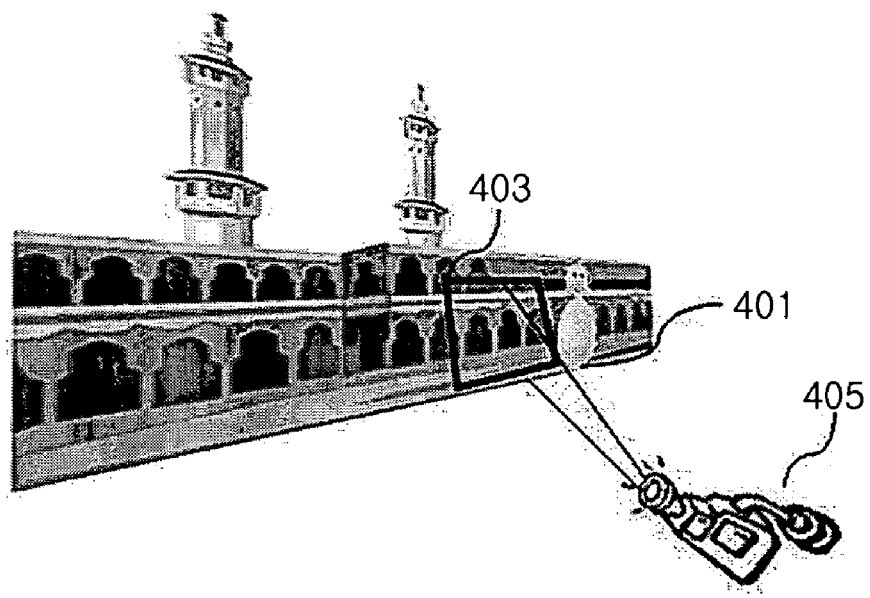
FIG. 4C is an image frame of another view point that can show the background covered with the deletion target object can be observed.

FIG. 4C is an image frame of another view point that can show the background covered with the deletion target object can be observed.

As shown in FIG. 4A, if a deletion target object 401 is designated in the image frame, the projection matrix of the first view point is generated based on 3D position and posture, and a focal length of a camera 402 photographing the image frame, which is of the first view point.

As shown in FIG. 4B, the 3D position and posture information, focal length information and the background region coordinates of the camera 404 photographing the image frame in the image frame of a second view point that reveals a background 403 covered with the deletion target object are stored.

As shown in FIG. 4C, the 3D position and posture information, focal length information, and the background region coordinates of the camera 405 photographing the image frame in the image frame of a third view point that shows the background 403 covered with the deletion target object are stored.

Figure 4D:
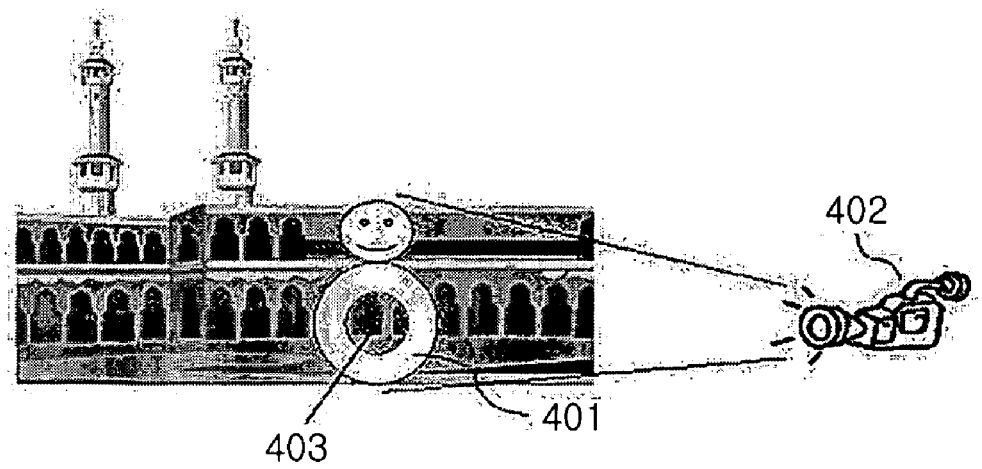
FIG. 4D is an image frame obtained by deleting the object and recovering the background in accordance with an embodiment of the present invention.

If the background is recovered according to the present invention, the object is deleted and the background of the deleted part is recovered, as shown in FIG. 4D.

Figure 5A:
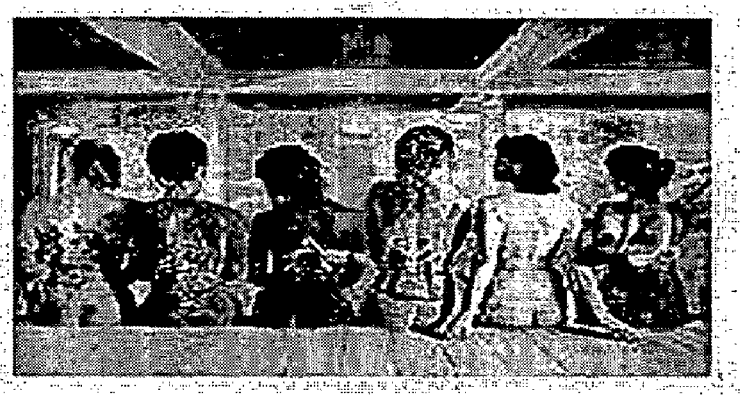
FIG. 5A is an exemplary image frame of an arbitrary view point.
Figure 5B:
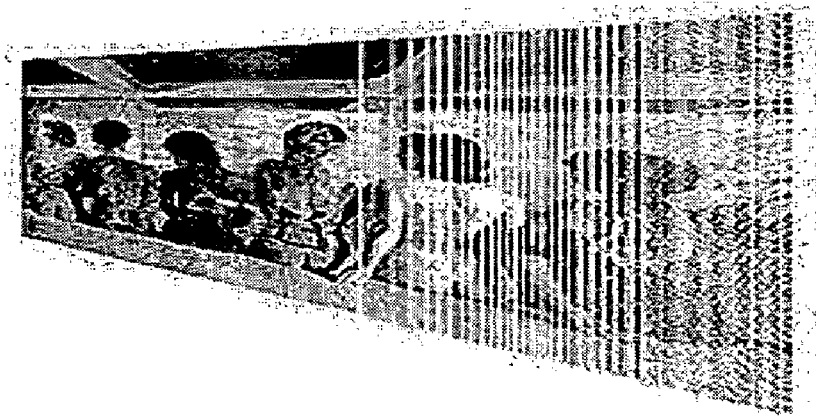
FIG. 5B is an exemplary image frame obtained by geometrically modifying the image frame of FIG. 5A into an image frame of another view point.

FIG. 5A is an exemplary image frame of an arbitrary view point and FIG. 5B is an exemplary image frame obtained by geometrically modifying the image frame of FIG. 5A into an image frame of another view point.

Figure 5C:
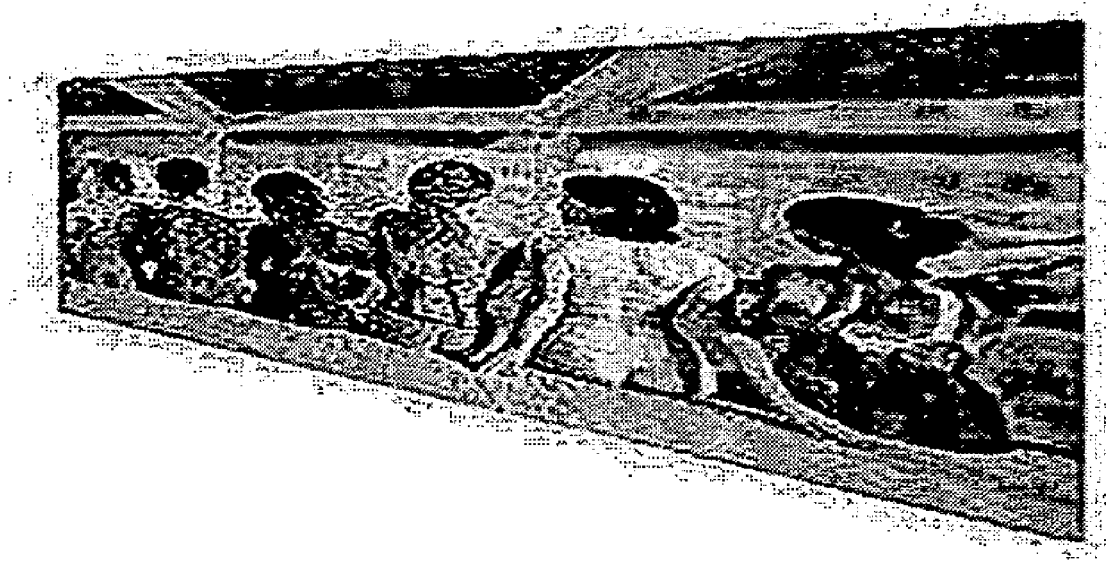
FIG. 5C is an image frame obtained by applying an interpolation technique to the image frame of FIG. 5B.

FIG. 5C is an image frame obtained by applying an interpolation technique to the image frame of FIG. 5B.

The present invention uses the image frame of the second and third view points, in which the background covered with the object can be seen, to delete arbitrary object of the first image frame and recover the background of the object. That is, the image of the first view point is recovered by using the image information of the second and third view points.

That is, FIG. 5A is an exemplary diagram showing the image frame of another view point, and FIG. 5B is an exemplary diagram showing the image frame of FIG. 5A which is modified into the first view point. FIG. 5C is an exemplary diagram showing an image frame with corrected resolution obtained by applying the interpolation technique to the image frame of FIG. 5B.

Figure 6A:
FIG. 6A is an original image with an object to be deleted and the background to be recovered.
Figure 6B:
FIG. 6B is an image of another view point that shows the background covered with the object of FIG. 6A.
Figure 6C:
FIG. 6C is an image showing that the background of FIG. 6A is recovered by using the image of FIG. 6B.

FIG. 6A is an original image with an object to be deleted and the background to be recovered and FIG. 6B is an image of another view point that shows the background covered with the object of FIG. 6A. FIG. 6C is an image showing that the background of FIG. 6A is recovered by using the image of FIG. 6B.

That is, when an object of arbitrary region 701 in FIG. 6A is deleted, and the background of the region 701 is recovered, the background is recovered by using the image of FIG. 6B, which is the image of another view point that reveals the background of FIG. 6.

Precisely, the projection matrix is generated by using the 3D position and posture information and the focal length of the camera photographing the image of FIG. 6A. The background of FIG. 6B is modified into a 2D image based on view point of FIG. 6A by multiplying the projection matrix by the 3D geometric information of the deletion target object region 701 of FIG. 6B. The modified 2D image is inserted into the deletion target object region 701 of FIG. 6A with reflecting depth information, thereby obtaining the image as shown in FIG. 6C.

As described in detail, the present invention can be embodied as a program and stored in a computer-readable recording medium, such as CD-ROM, RAM, ROM, a floppy disk, a hard disk and a magneto-optical disk. Since the process can be easily implemented by those skilled in the art, further description will not be provided herein.

The present invention that allows easy camera movement can delete the object and recover the background behind the object even although the object is not moved in comparison with the background.

The present application contains subject matter related to Korean patent application Nos. 2004-0102663, and 2005-034890 filed with the Korean Intellectual Property Office on Dec. 7, 2004, and Apr. 27, 2005, respectively, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A background recovering apparatus for deleting an object of an arbitrary region in an input image sequence and recovering a background, comprising:

a storing means for storing the input image sequence, and storing the three dimensional (3D) position and posture information, and focal length information of a camera photographing an image;

a projection matrix generating means for generating a projection matrix of a first view point by using the 3D position and posture information and focal length information of the camera photographing an image frame of the first view point, in which a deletion target object exits;

a geometric information extracting means for extracting 3D geometric information with respect to the background by using the 3D position and posture information, focal length information, and the background region coordinates of the camera photographing an image frame of another view point that reveals the background behind the deletion target object;

a background image generating means for generating the background image whose view point is changed into the first view point by multiplying the 3D geometric information for the background extracted from image frame of another view point by the projection matrix; and a background image inserting means for recovering the background by inserting the background image, whose view point is changed into the first view point, into an arbitrary region of the first view point.

2. The apparatus as recited in claim 1, wherein the geometric information extracting means extracts 3D geometric information with respect to the background covered with deletion object target by using the 3D position and posture information, focal length information, and the background region coordinates of a camera photographing the image frame of the second view point that reveals background covered with the deletion target object, and by using the 3D position and posture information, focal length information and the background region coordinates of the camera photographing the image frame of the third view point that reveals background covered with an deletion target object.

3. The apparatus as recited in claim 1, further comprising:

a resolution interpolating means for correcting resolution by interpolating the background image whose view point is changed into the first view point, wherein the background image being generated in the background image generating means.

4. A method for deleting an object of an arbitrary region in the input image sequence and recovering the background comprising: using a processor to perform steps of a) generating the projection matrix of a first view point by using 3D position and posture information, and the focal length information of a camera photographing an image frame of the first view point, where the deletion target object exists;

b) extracting 3D geometric information for the background by using the 3D position and posture information, the focal length information, and the background region coordinates of the camera photographing the image frame that reveals the background covered with the deletion target object;

c) generating the background image whose view point is changed into the first view point by multiplying the projection matrix by the 3D geometric information for the background extracted from an image frame of another view point; and d) recovering the background by inserting the background image that the view point is changed into the first view point into an arbitrary region of the first point.

5. The method as recited in claim 4, wherein, in the step b), 3D geometric information with respect to the background covered with deletion target object is extracted by using the 3D position and posture information, focal length information, and the background region coordinates of the camera photographing the image frame of a second view point that reveals the background covered with the deletion target object, and by using the 3D position and posture information, focal length information and the background region coordinates of the camera photographing the image frame of a third view point that reveals the background covered with an deletion target object.

6. The method as recited in claim 4, further comprising the step of:

e) correcting resolution by interpolating the background image whose view point is changed into the first view point, the background image is generated in the background image generating means.

* * * * *